United States Patent
Ihle et al.

(10) Patent No.: US 10,908,030 B2
(45) Date of Patent: Feb. 2, 2021

(54) SENSOR ELEMENT AND METHOD FOR PRODUCING A SENSOR ELEMENT

(71) Applicant: EPCOS AG, Munich (DE)

(72) Inventors: Jan Ihle, Raaba-Grambach (AT); Anke Weidenfelder, Graz (AT); Christl Lisa Mead, St. Martin Island (AT); Gerald Kloiber, Feldkirchen (AT)

(73) Assignee: EPCOS AG, München (DE)

( * ) Notice: Subject to any disclaimer, the term of this patent is extended or adjusted under 35 U.S.C. 154(b) by 166 days.

(21) Appl. No.: 15/773,156

(22) PCT Filed: Oct. 18, 2016

(86) PCT No.: PCT/EP2016/074944
§ 371 (c)(1),
(2) Date: May 2, 2018

(87) PCT Pub. No.: WO2017/076632
PCT Pub. Date: May 11, 2017

(65) Prior Publication Data
US 2018/0321091 A1 Nov. 8, 2018

(30) Foreign Application Priority Data

Nov. 2, 2015 (DE) .................. 10 2015 118 720
Jan. 25, 2016 (DE) .................. 10 2016 101 249

(51) Int. Cl.
*G01K 7/22* (2006.01)
*G01K 7/16* (2006.01)
(Continued)

(52) U.S. Cl.
CPC ............... *G01K 7/22* (2013.01); *B28B 3/02* (2013.01); *B28B 11/243* (2013.01); *G01K 7/16* (2013.01);
(Continued)

(58) Field of Classification Search
CPC ... G01K 7/16; G01K 7/22; G01K 13/02; G01K 1/14; H01C 7/008; H01C 7/04;
(Continued)

(56) References Cited

U.S. PATENT DOCUMENTS 3,477,055 A * 11/1969 Ewing ................ H01C 7/043
338/22 R
3,547,835 A * 12/1970 Short ............... H01C 17/06526
252/514
(Continued)

FOREIGN PATENT DOCUMENTS

CH 499856 A 11/1970
CN 86108011 A 1/1988
(Continued)

*Primary Examiner* — Gail Kaplan Verbitsky
(74) *Attorney, Agent, or Firm* — Slater Matsil, LLP

(57) ABSTRACT

A sensor element and a method for producing a sensor element are disclosed. In an embodiment a sensor element includes a ceramic carrier having a top side and an underside, a respective NTC layer arranged on the top side and on the underside of the carrier and at least one electrode, wherein a resistance of the respective NTC layer depends on a thickness and/or geometry of the respective NTC layer.

20 Claims, 2 Drawing Sheets

(51) Int. Cl.

| | |
|---|---|
| *B28B 3/02* | (2006.01) |
| *B28B 11/24* | (2006.01) |
| *H01C 7/04* | (2006.01) |
| *H01C 17/28* | (2006.01) |
| *G01K 7/18* | (2006.01) |
| *H01C 7/00* | (2006.01) |
| *H01C 17/08* | (2006.01) |
| *H01C 17/12* | (2006.01) |
| *H01C 17/075* | (2006.01) |

(52) U.S. Cl.
CPC ............... *G01K 7/18* (2013.01); *H01C 7/008* (2013.01); *H01C 7/043* (2013.01); *H01C 17/08* (2013.01); *H01C 17/12* (2013.01); *H01C 17/281* (2013.01); *H01C 17/283* (2013.01); *H01C 17/075* (2013.01)

(58) Field of Classification Search
CPC ...... H01C 17/006; H01C 7/18; H01C 1/1413; H01C 1/032; H01C 1/00; H01C 3/14
See application file for complete search history.

(56) References Cited

U.S. PATENT DOCUMENTS

| | | | |
|---|---|---|---|
| 3,989,438 A | 11/1976 | Smith et al. | |
| 4,160,227 A * | 7/1979 | Ikegami | H01C 7/041 252/514 |
| 4,230,731 A | 10/1980 | Tyler | |
| 4,359,372 A * | 11/1982 | Nagai | H01C 7/041 204/192.21 |
| 4,518,839 A | 5/1985 | Taguchi et al. | |
| 4,743,881 A | 5/1988 | Howng | |
| 5,140,393 A | 8/1992 | Hijikihigawa et al. | |
| 5,161,893 A | 11/1992 | Shigezawa et al. | |
| 5,406,246 A | 4/1995 | Friese et al. | |
| 5,610,571 A | 3/1997 | Kuzuoka | |
| 6,078,250 A | 6/2000 | Ueda et al. | |
| 6,082,609 A | 7/2000 | Wienand et al. | |
| 6,232,868 B1 | 5/2001 | Rehnelt | |
| 6,245,628 B1 | 6/2001 | Fukui et al. | |
| 6,304,167 B1 | 10/2001 | Nakayama | |
| 6,354,736 B1 * | 3/2002 | Cole | G01K 7/183 338/22 R |
| 6,368,734 B1 | 4/2002 | Mihara et al. | |
| 6,636,143 B1 | 10/2003 | Hashimoto et al. | |
| 6,690,258 B2 | 2/2004 | Katsuki et al. | |
| 6,766,574 B2 | 7/2004 | Mizoguchi et al. | |
| 6,856,233 B2 * | 2/2005 | Tsukada | H01C 17/24 338/195 |
| 7,164,341 B2 | 1/2007 | Katsuki et al. | |
| 7,292,132 B1 * | 11/2007 | Kozhukh | G01K 1/08 338/22 R |
| 7,312,690 B1 | 12/2007 | Geer | |
| 7,420,319 B2 | 9/2008 | Kastl et al. | |
| 7,432,123 B1 | 10/2008 | Kozhukh | |
| 7,547,407 B2 | 6/2009 | Matsuda et al. | |
| 8,228,160 B2 | 7/2012 | Kloiber et al. | |
| 8,373,535 B2 | 2/2013 | Lavenuta | |
| 8,519,866 B2 | 8/2013 | Mitchell et al. | |
| 8,598,975 B2 | 12/2013 | Miura | |
| 8,946,885 B2 | 2/2015 | Krauss | |
| 9,040,338 B2 | 5/2015 | Eisele | |
| 9,620,266 B2 | 4/2017 | Ortner et al. | |
| 10,072,989 B2 * | 9/2018 | Aliane | G01K 7/24 |
| 10,636,550 B2 * | 4/2020 | Duan | H01C 1/142 |
| 2001/0001205 A1 * | 5/2001 | Ishikawa | H01C 7/043 252/500 |
| 2003/0001261 A1 | 1/2003 | Ueda et al. | |
| 2003/0178396 A1 * | 9/2003 | Naumov | H01C 17/242 219/121.69 |
| 2005/0101843 A1 | 5/2005 | Quinn et al. | |
| 2006/0012247 A1 | 6/2006 | Kill et al. | |
| 2006/0122473 A1 | 6/2006 | Kill et al. | |
| 2008/0219319 A1 | 9/2008 | Buckalew | |
| 2009/0040009 A1 | 2/2009 | Goto et al. | |
| 2009/0268779 A1 | 10/2009 | Hotta et al. | |
| 2010/0226757 A1 | 9/2010 | Mitchell et al. | |
| 2011/0068890 A1 | 3/2011 | Yang et al. | |
| 2011/0277913 A1 | 11/2011 | Kuegerl et al. | |
| 2012/0049997 A1 * | 3/2012 | Lim | H01L 21/76834 338/308 |
| 2013/0187748 A1 | 7/2013 | Sha et al. | |
| 2013/0228890 A1 | 9/2013 | Eisele | |
| 2013/0300533 A1 * | 11/2013 | Bisplinghoff | H01C 1/1406 338/22 R |
| 2014/0137401 A1 * | 5/2014 | Lannert | F24F 1/42 29/700 |
| 2014/0232514 A1 * | 8/2014 | Miura | H01C 1/1406 338/22 R |
| 2014/0292474 A1 * | 10/2014 | Ryu | H01C 1/012 338/306 |
| 2015/0170805 A1 | 6/2015 | Ito et al. | |
| 2015/0200043 A1 | 7/2015 | Kamada et al. | |
| 2015/0300919 A1 | 10/2015 | Ante et al. | |
| 2015/0346039 A1 | 12/2015 | Ito | |
| 2016/0299011 A1 | 10/2016 | Ihle et al. | |
| 2016/0338149 A1 * | 11/2016 | Sweeney | H05B 3/141 |
| 2016/0377490 A1 | 12/2016 | Nivala et al. | |
| 2017/0162303 A1 | 6/2017 | Strallhofer et al. | |
| 2017/0219440 A1 | 8/2017 | Strallhofer et al. | |
| 2017/0234818 A1 | 8/2017 | Jesme et al. | |
| 2018/0301253 A1 * | 10/2018 | Grunbichler | H01C 7/045 |
| 2018/0306647 A1 * | 10/2018 | Ihle | B28B 3/02 |

FOREIGN PATENT DOCUMENTS

| | | | |
|---|---|---|---|
| CN | 1192039 A | 9/1998 | |
| CN | 1261977 A | 8/2000 | |
| CN | 1261978 A | 8/2000 | |
| CN | 1367497 A | 9/2002 | |
| CN | 1433030 A | 7/2003 | |
| CN | 101022048 A | 8/2007 | |
| CN | 101206145 A | 6/2008 | |
| CN | 102034580 A | 4/2011 | |
| CN | 102052972 A | 5/2011 | |
| CN | 102150259 A | 8/2011 | |
| CN | 102216747 A | 10/2011 | |
| CN | 102288320 A | 12/2011 | |
| CN | 102674820 A | 9/2012 | |
| CN | 103403862 A | 11/2013 | |
| CN | 103650069 A | 3/2014 | |
| CN | 203707180 U * | 7/2014 | |
| CN | 104124014 A | 10/2014 | |
| CN | 104167269 A * | 11/2014 | |
| CN | 204007925 U * | 12/2014 | |
| CN | 104285141 A | 1/2015 | |
| CN | 1774822 A | 5/2016 | |
| CN | 106574872 A | 4/2017 | |
| DE | 3634132 A1 | 4/1987 | |
| DE | 4025715 C1 | 4/1992 | |
| DE | 69001779 T2 | 1/1994 | |
| DE | 4329312 A1 | 3/1994 | |
| DE | 19953161 A1 | 1/2001 | |
| DE | 10152537 A1 | 10/2002 | |
| DE | 69808499 T2 | 1/2003 | |
| DE | 102010050315 A1 | 5/2012 | |
| DE | 102012110849 A1 | 5/2014 | |
| DE | 112013003510 T5 | 4/2015 | |
| EP | 0809094 A1 | 11/1997 | |
| EP | 1227308 A1 | 7/2002 | |
| EP | 1417483 A2 | 5/2004 | |
| EP | 2472529 A1 * | 7/2012 | G01K 7/22 |
| EP | 2899518 A1 | 7/2015 | |
| GB | 1266706 A | 3/1972 | |
| GB | 2183344 B | 3/1990 | |
| JP | S60-003102 A | 1/1985 | |
| JP | H0562806 A | 3/1993 | |
| JP | H6007204 U | 1/1994 | |
| JP | H0682315 A | 3/1994 | |
| JP | H06160204 A | 6/1994 | |
| JP | H07174635 A | 7/1995 | |

(56) References Cited

FOREIGN PATENT DOCUMENTS

| | | | |
|---|---|---|---|
| JP | H08115804 A | 5/1996 | |
| JP | H08292102 A | 11/1996 | |
| JP | H0921707 A | 1/1997 | |
| JP | H1073498 A | 3/1998 | |
| JP | 2000150204 A | 5/2000 | |
| JP | 2002048655 A | 2/2002 | |
| JP | 2002305102 A | 10/2002 | |
| JP | 2007093453 A | 4/2007 | |
| JP | 2007281077 A | 10/2007 | |
| JP | 2008157936 A | 7/2008 | |
| JP | 2009076838 A | 4/2009 | |
| JP | 2012129341 A | 7/2012 | |
| JP | 2015034760 A | 2/2015 | |
| JP | 2015129731 A | 7/2015 | |
| JP | 2018522513 A | 8/2018 | |
| WO | 9901875 A1 | 1/1999 | |
| WO | 2003008928 A3 | 1/2003 | |
| WO | WO-2009111937 A1 * | 9/2009 | ............ H01C 7/041 |
| WO | 2011024724 A1 | 3/2011 | |
| WO | 2012059401 A2 | 5/2012 | |
| WO | 2013007575 A1 | 1/2013 | |
| WO | 2014072123 A2 | 5/2014 | |
| WO | 2015110986 A1 | 7/2015 | |

* cited by examiner

SENSOR ELEMENT AND METHOD FOR PRODUCING A SENSOR ELEMENT

This patent application is a national phase filing under section 371 of PCT/EP2016/074944, filed Oct. 18, 2016, which claims the priority of German patent application 10 2015 118 720.5, filed Nov. 2, 2015 and German patent application 10 2016 101 249.1, filed Jan. 25, 2016, each of which is incorporated herein by reference in its entirety.

TECHNICAL FIELD

A sensor element is specified. The sensor element can serve in particular for measuring a temperature. By way of example, an NTC (negative temperature coefficient) sensor element is involved, that is to say an NTC thermistor. Furthermore, a method for producing a sensor element is specified.

BACKGROUND

The prior art discloses measuring temperatures for monitoring and regulation in a wide variety of applications predominantly using ceramic NTC thermistor elements (NTC), silicon temperature sensors (KTY), platinum temperature sensors (PRTD) or thermocouples (TC).

NTC thermistors are the most widely used here on account of the low production costs. A further advantage over thermocouples and metallic resistance elements, such as, e.g., Pt elements, consists in the pronounced negative resistance-temperature characteristics.

SMD NTC temperature sensors attached by soldering are predominantly used for use in power modules. In the case of control modules for low powers, NTC chips are also used as an alternative thereto, said NTC chips being mounted at the underside by means of Ag sintering paste, soldering or adhesive bonding and the top side of said NTC chips being contacted via a bond wire.

Metallic electrodes have to be applied for an electrical contacting of the NTC ceramic. According to the prior art, for this purpose thick-film electrodes predominantly comprising silver or gold pastes are applied by means of a screenprinting process with subsequent firing.

The silver metallizations are particularly suitable for soldering connections. On account of the rising technological requirements with regard to new reliable connection contactings such as bonding and welding, especially in the case of bonding using gold or aluminum and/or copper wires a different electrode is necessary since a linking to silver does not have sufficient reliability.

Soldering connections to connection wires cannot be realized in the case of gold metallizations. Bond connections are realized only using thin gold wire for cost reasons. Aluminum bond wire connections on gold electrodes do not achieve the reliability requirements.

On account of the rising requirements regarding use temperature and reliability, there is furthermore a demand for NTC temperature sensors which have a high long-term stability and are suitable for larger ranges of use temperatures or can be employed for different use temperatures.

SUMMARY OF THE INVENTION

Embodiments provide a sensor element which has improved properties.

In accordance with one aspect, a sensor element for temperature measurement is specified. The sensor element may comprise a ceramic sensor material. The sensor element may be an NTC sensor chip. The sensor material may be embodied in the form of at least one NTC layer. The sensor element may comprise a ceramic carrier. The sensor element furthermore comprises at least one electrode. The sensor element may comprise two or more electrodes.

The carrier comprises a top side and an underside. The sensor material, for example, in the form of an NTC layer, is arranged in each case on the top side and on the underside of the carrier. The sensor element may be a double NTC thick-film sensor. The top side and the underside may be printed with the sensor material. The top side and the underside of the carrier can be printed with the sensor material in each case over the whole area or else only partially. The printing geometry can be different. In other words, the top side can have a different printing geometry with sensor material than the underside. The NTC layers can, for example, be individually driven and/or have different R-T characteristic curves. A resistance of the respective NTC layer may be determined by a thickness and/or geometry of the respective NTC layer.

The corresponding design may provide a cost-effective NTC temperature sensor which simultaneously has two characteristic curves and thus extends the temperature accuracy in the measurement range in the case of correspondingly adapted R-T characteristic curves. Furthermore, space during mounting can be saved by the realization of two characteristic curves in a single component.

In accordance with one exemplary embodiment, at least one electrode is applied to each of the NTC layers. By way of example, at least two electrodes are applied to each of the NTC layers. The electrodes are separated from one another by a free region. By way of example, the free region is embodied in the form of a web. The electrodes are separated from one another by the web. The free region is free of electrode material or can be filled with a protective layer.

Electrodes arranged alongside one another on one side have the advantage that a contacting is possible from only one side. By way of example, it is possible to carry out the contacting on the printed circuit board on one side by means of adhesive bonding, soldering or Ag sintering. On the top side, a contacting on one side by means of, e.g., welding, bonding or soldering of connection wires is likewise possible by means of electrodes arranged alongside one another.

In accordance with one exemplary embodiment, a first electrode can be applied directly on the ceramic carrier, preferably on the top side of the carrier. An NTC layer is applied on at least one partial region of said first electrode. A further or second electrode layer or electrode is situated on the NTC layer. The further or second electrode preferably completely covers the NTC layer.

A further NTC layer is arranged on—for example—the underside of the carrier. At least one electrode is applied on said NTC layer. By way of example, at least two electrodes are applied on the NTC layer. The electrodes are separated from one another by a free region. The free region is free of electrode material or can be filled with a protective layer.

Electrodes arranged alongside one another on the underside have the advantage that a contacting is possible from only one side. By way of example, it is thereby possible to carry out the contacting on the printed circuit board on one side by means of adhesive bonding, soldering or Ag sintering. On the top side, a significantly larger cross section of the sensor material is usable as a result of the layer-like arrangement of first electrode, NTC layer and further electrode, which enables lower resistances.

In accordance with one exemplary embodiment, the respective electrode comprises at least one sputtered layer. The electrodes are thin-film electrodes, for example. The sputtered layer is preferably directly applied to the respective NTC layer. The at least one sputtered layer preferably comprises nickel. The at least one sputtered layer can furthermore comprise proportions of vanadium. In a further embodiment, the electrode comprises two layers, wherein a first or lower layer comprises chromium or titanium and a second or upper layer comprises nickel and can likewise comprise proportions of vanadium. Advantageously, for the embodiment described, a cap layer is applied to the nickel layer. Said cap layer consists of an oxidation-inhibiting metal such as, e.g., silver or gold.

In accordance with one exemplary embodiment, the respective electrode comprises at least one printed layer. The electrodes are thick-film electrodes, for example. The printed layer is preferably directly printed onto the respective NTC layer. Thicker electrode layers can be realized by means of the printing process.

In the case of resistances stipulated with very narrow tolerances, a so-called trimming process can be carried out for setting the resistance at nominal temperature. In this case, a partial region, for example, of one or both NTC layers, is removed by partial laser removal, thus giving rise to a cutout. By means of the trimming process, the geometry of the NTC layer is changed and the resistance is adapted in accordance with a predefined value.

In accordance with one aspect, a method for producing a sensor element is described. Preferably, the sensor element described above is produced by the method. All properties disclosed with regard to the sensor element or the method are also correspondingly disclosed with regard to the respective other aspects, and vice versa, even if the respective property is not explicitly mentioned in the context of the respective aspect.

The method comprises the following steps:

producing NTC powder for forming at least one NTC layer. The NTC powder is based on perovskites in the Y—Ca—Cr—Al—O system with diverse dopings or spinels in the Ni—Co—Mn—O system with diverse dopings;

providing a ceramic carrier material. A ceramic substrate based on, e.g., $Al_2O_3$, $ZrO_2$, ATZ or ZTA materials or MgO serves as carrier material;

printing a first surface of the carrier material with NTC paste in a first printing geometry. The printing of the first surface, for example, of the underside, is carried out in one printing process or in a plurality of printing processes. By way of example, two, three, five or ten printing processes are carried out. The first surface can be partially or partly printed with NTC paste. The NTC paste can be printed onto the first surface with a predetermined thickness (thickness of the later NTC layer);

sintering the system comprising carrier material and NTC layer;

printing a second surface of the carrier material with NTC paste in a second printing geometry. The printing of the second surface, for example, of the top side, is carried out in one printing process or in a plurality of printing processes. By way of example, two, three, five or ten printing processes are carried out. The second surface can be partially or partly printed with NTC paste. The second printing geometry can be identical to the first printing geometry. Alternatively, the first and second printing geometries can also differ from one another. By way of example, the second NTC layer can be printed in such a way that a free edge remains on the second surface. The NTC paste can be printed onto the second surface with a predetermined thickness (thickness of the later NTC layer). The thicknesses of the first and second NTC layers can differ. By way of example, the first NTC layer can have a larger thickness than the second NTC layer, or vice versa. As an alternative thereto, the thicknesses of the NTC layers can also be identical. In addition, this NTC layer which is applied on the second surface can have a ceramic composition the same as or different than that of the NTC layer applied on the first surface. Identical or different electrical properties can be set as a result; and sintering the system.

As an alternative thereto, before the first sintering, it is also possible firstly for the second surface of the carrier material to be printed with NTC paste. In this case, a joint sintering process can be carried out.

In a further step, it is possible to carry out a partial removal of at least one NTC layer by means of laser cutting, grinding or sawing such that the resistance is adapted by means of the geometry alteration. It is also possible, for example, to remove partial regions from both NTC layers.

In accordance with one aspect, a sensor element for temperature measurement is specified, comprising:

a ceramic carrier; and at least one electrode, wherein the carrier comprises a top side and an underside, wherein a respective NTC layer is arranged on the top side and on the underside of the carrier, and wherein a resistance of the respective NTC layer is determined by a thickness and/or geometry of the respective NTC layer. Alternatively or additionally, the resistance can be determined by the choice of the ceramic composition.

The sensor element is explained in greater detail below with reference to exemplary embodiments and the associated figures.

BRIEF DESCRIPTION OF THE DRAWINGS

The drawings described below should not be interpreted as true to scale. Rather, for the sake of better illustration, individual dimensions may be illustrated in an enlarged, reduced or even distorted manner.

Elements that are identical to one another or perform the same function are designated by identical reference signs.

DETAILED DESCRIPTION OF ILLUSTRATIVE EMBODIMENTS

Figure 1:
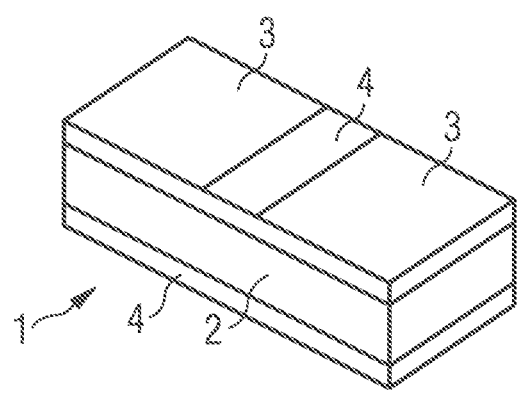
FIG. 1 shows a sensor element in a first embodiment.

FIG. 1 shows a sensor element 1, in particular a sensor chip. The sensor element 1 is preferably configured for measuring a temperature. The sensor element 1 comprises a ceramic sensor material (NTC layer 4). In particular, the sensor material is an NTC ceramic. By way of example, the ceramic has a Perovskite structure. In particular, the ceramic can be based on the Y—Ca—Cr—Al—O system with diverse dopings. Such a sensor element 1 is particularly suitable for high-temperature applications. Alternatively, the sensor element 1, particularly in the case of lower application temperatures, can comprise a ceramic having a spinel structure. By way of example, the ceramic can be based on the Ni—Co—Mn—O system with diverse dopings.

On account of the R-T characteristic curve of an NTC temperature sensor according to the prior art, it is not possible to effect measurement over a wide temperature range with consistently high accuracy. Proceeding from the nominal temperature of the resistance, the tolerance thereof increases. Therefore, the accuracy of the temperature detection at very high or low temperatures, far away from the nominal temperature of the resistance, is significantly lower. In the case of a use temperature that can be narrowly delimited, it is then possible to adapt the specification such that the nominal temperature is near the use temperature and in return an accurate measurement is thus made possible. However, if a wide temperature range is to be detected with high accuracy, two or more NTC temperature sensors having different characteristic curves or nominal temperatures have to be used for this purpose. This often leads to space problems during mounting on the DCB board or the circuit board.

Therefore, FIG. 1 shows a sensor element 1 in which two characteristic curves are realized in one component. The sensor element 1 comprises the sensor material described above. The sensor material is an NTC layer 4 or is incorporated in the form of at least one NTC layer 4. The sensor element 1 furthermore comprises a ceramic carrier 2. A ceramic substrate based on, e.g., $Al_2O_3$, $ZrO_2$, ATZ or ZTA materials or MgO serves as the carrier 2. The NTC pastes are based, as described above, either on Perovskites in the Y—Ca—Cr—Al—O system with diverse dopings or on the spinels in the Ni—Co—Mn—O system with diverse dopings.

The carrier 2 is printed with an NTC layer 4 on both sides. In particular, a first outer face or surface (e.g., a top side) of the carrier 2 is printed with a first NTC layer 4. A second outer face or surface of the carrier 2 (e.g., an underside) is printed with a second NTC layer 4. The sensor element 1 is thus a double NTC thick-film sensor.

The NTC layers 4 in each case completely cover the top side and the underside of the carrier 2. After a sintering process, electrodes 3 are fitted to the NTC layers 4. The electrodes 3 are applied to the NTC layers 4 by means of thick- or thin-film technology, as will be described in detail later.

In the case of resistances stipulated with very narrow tolerances, it is furthermore possible to carry out a so-called trimming process for setting the resistance at nominal temperature by means of partial laser removal, as will be explained in even further detail in association with Figures 3 and 4.

The contacting of the sensor to the DCB board or the circuit board can be carried out by means of Ag sintering, soldering or adhesive bonding. Wires can be mounted on the top side by means of soldering, bonding or welding.

Figure 2:
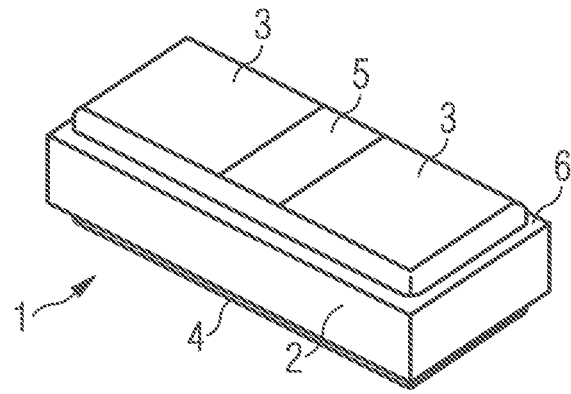
FIG. 2 shows the sensor element in a further embodiment.

FIG. 2 shows a double NTC thick-film sensor 1 having a free edge 6. In contrast to the sensor element 1 shown in FIG. 1, in the case of the sensor element 1 from FIG. 2 a circumferential edge region of the carrier 2 is free of sensor material or free of the NTC layer 4. In particular, the NTC layers 4 do not completely cover the top side and/or the underside of the carrier 2. Rather, a circumferential edge region of the carrier 2 is discernible, which is not covered by sensor material. In this exemplary embodiment, the free edge 6 is implemented on the top side and the underside of the carrier 2.

The free edge 6 can thus be present on both sides of the carrier 2. As an alternative thereto, the free edge 6 can also be present only on one side of the carrier 2. In other words, the NTC layers 4 can have a different printing geometry. By way of example, a first NTC layer 4 can completely cover a first outer face or surface of the carrier (for example, the top side of the carrier 2). A second NTC layer 4 can only partly cover a second outer face or surface of the carrier 2 (for example, the underside of the carrier 2), such that preferably an edge region of the carrier 2 is free of the NTC layer 4. As a result, it is possible to achieve different resistance values for the NTC layers 4. The thickness of the NTC layers 4 can also be different. By means of different thicknesses of the NTC layers 4, it is possible to achieve different resistance values for the NTC layers 4.

Figure 3:
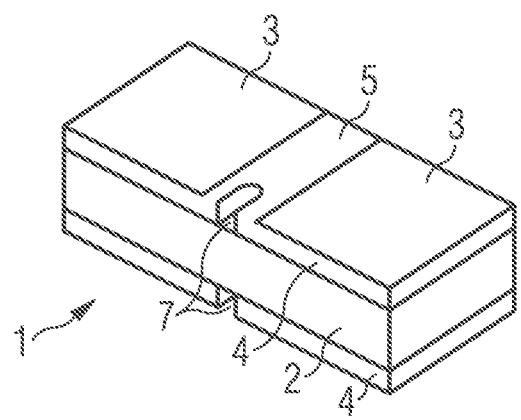
FIG. 3 shows the sensor element in a further embodiment.

FIG. 3 shows a trimmed double NTC thick-film sensor 1.

The trimming serves for setting the resistance at nominal temperature by means of partial laser removal. In this exemplary embodiment, the trimming was affected here both on a top side and on an underside of the sensor element 1.

In this case, the NTC layers 4 each have a cutout 7. The cutout 7 is arranged in an intermediate region between the electrodes 3. This leads to an altered geometry of the respective NTC layer 4, as a result of which the resistance of the respective NTC layer 4 is set. Otherwise the construction of the sensor element 1 from FIG. 3 substantially corresponds to the construction of the sensor element 1 from FIG. 1.

In an alternative exemplary embodiment (not explicitly illustrated), it is also possible for only one of the two NTC layers 4 to be trimmed. In this case, only one NTC layer 4 has a cutout 7. As an alternative thereto, the NTC layers 4 can be trimmed differently. In this case, the NTC layers 4 have cutouts 7 of different sizes.

Figure 4:
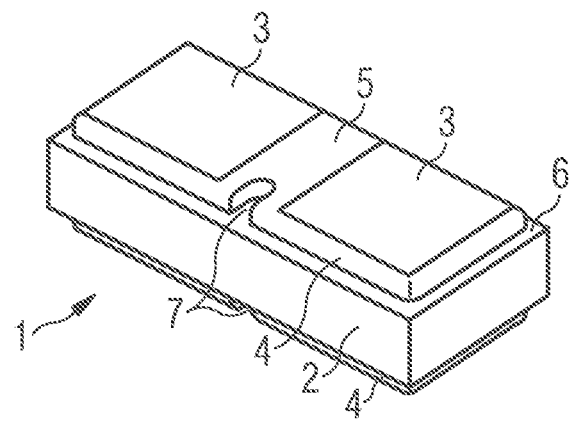
FIG. 4 shows the sensor element in a further embodiment.

FIG. 4 shows a trimmed double NTC thick-film sensor having a free edge 6. As in the case of the sensor element 1 from FIG. 3, in this case a partial removal is carried out by laser treatment (cutout 7). The cutout 7 is found at both NTC layers 4. However, the cutout 7 can also—as explained in association with FIG. 3—be implemented only in the case of one NTC layer 4 or the NTC layers 4 can have cutouts of different sizes.

Furthermore, a circumferential edge region of the carrier 2 is discernible, which is not covered by sensor material (NTC layer 4). The free edge 6 is arranged on the top side and the underside of the carrier 2. As an alternative thereto, the free edge 6 can also be embodied only at one outer face or surface of the carrier 2, for example, at the top side or at the underside. As an alternative thereto, the free edge 6 also need not be embodied circumferentially, but rather can be embodied only partially.

To summarize, the sensor element in accordance with FIGS. 1 to 6 is constructed as follows:

Firstly, the carrier material is printed on both sides with NTC paste. The printing can be carried out over the whole area or partially. In this case, the two NTC thick layers 4 of the sensor need not have the same printing geometry. The NTC thick layers 4 can have either the same or different characteristic curves and be driven individually in order to cover a greater range of use and different applications. The resistance of the NTC layers 4 can be set individually by means of the respective thickness of the NTC layer 4 and the geometry thereof.

When applying the electrodes 3, it is possible to differentiate between thin- and thick-film technology. Thin-film electrodes can be produced by sputtering or vapor deposition. In this case, the basic electrode consists, in a first embodiment, of nickel layer, which can comprise proportions of vanadium, or, in a second embodiment, of two layers, wherein the lower layer comprises chromium or titanium and the second layer consists of nickel, which can likewise comprise proportions of vanadium. The basic electrode can be protected by a cap layer consisting of an oxidation-inhibiting metal such as, e.g., silver, gold, copper, aluminum, etc. Said cap electrode may either serve purely for protection against corrosion (oxidation) of the nickel basic electrode or else be advantageous or even necessary for the contacting. In the case of a linking by means of Ag sintering with finely dispersed silver pastes, a silver cap electrode, for example, is advantageous. For a migration-resistant, silver- and lead-free linking, it is possible to apply a gold cap layer.

Depending on the later contacting method by means of Ag sintering or soldering, the thickness of the basic electrode is less than 10 µm, advantageously less than 3 µm, ideally less than 0.5 µm. The thickness of the cap electrode can be up to 1 µm, in exceptional cases up to 20 µm.

Thick-film electrodes can be produced by means of a screenprinting process with subsequent firing. The pastes used can contain Ag and/or Au or possible admixtures.

Figure 5:
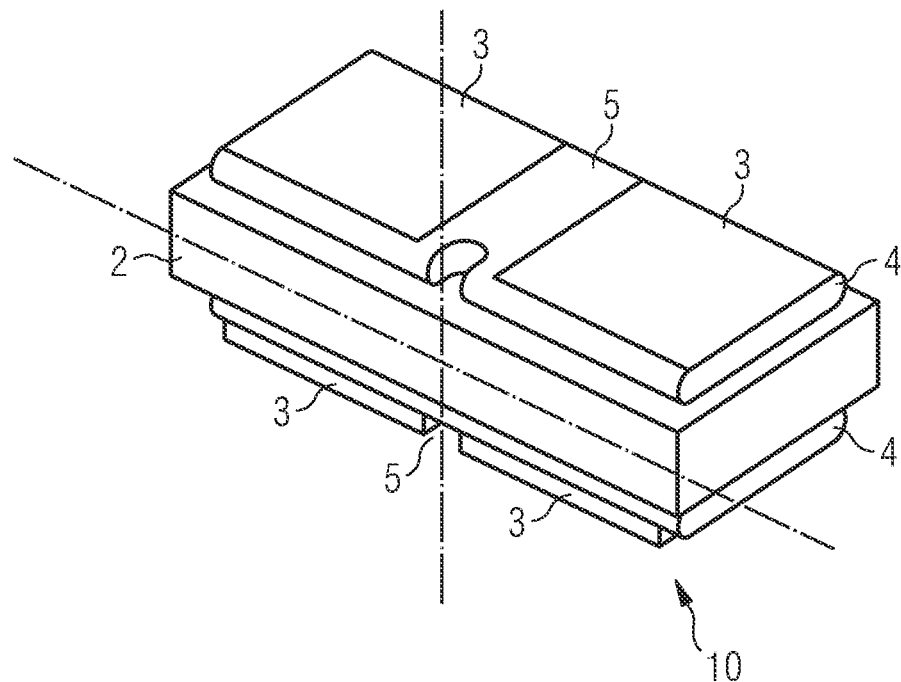
FIG. 5 shows the sensor element in another embodiment.

The design of the electrodes 3 can be implemented in accordance with three different variants:

In accordance with a first variant, two electrode pads are applied on the NTC thick layer 4, said electrode pad beings spatially separated from one another by a free region 5. This can be affected on both NTC thick layers 4 as shown in FIG. 5.

Figure 6:
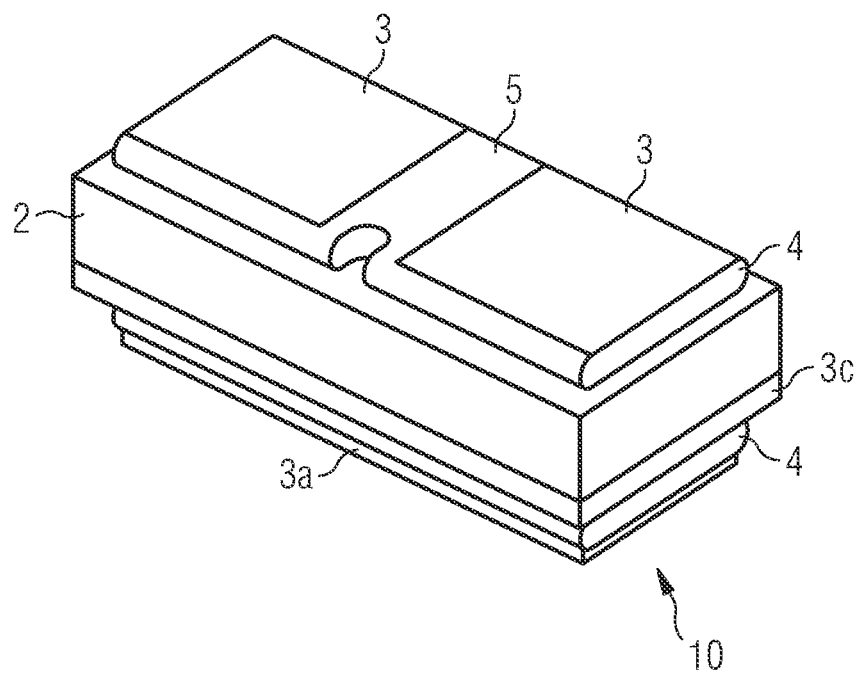
FIG. 6 shows the sensor element in yet another embodiment.

Variant 2: the metallization of the lower NTC thick layer 4 is carried out as described in variant 1 with two electrode pads separated from one another. On the top side 10, a first electrode 3c is applied to the carrier material 2 over the whole area. Afterward, said electrode 3c is printed with NTC paste 4 over the whole area or partially, the latter in turn being provided with an electrode 3a. This is shown in FIG. 6. The sintering process can be carried out jointly for all three plies or with intermediate firings of the individual plies. The contacting of the upper NTC thick layer 4 can be realized, e.g., by soldering, bonding or welding of wires. The electrode 3c applied on the top side of the ceramic carrier 2 over the whole area must comprise an electrically conductive material or an electrically conductive material composite which is suitable for joint sintering at temperatures of up to 1400° C. of the NTC layer 4 situated thereon. Pd- or Pt-containing Ag pastes are usually involved here.

For setting the resistance, the metallized substrates are electrically premeasured. The geometry of the double NTC thick-film sensor is defined on the basis of the premeasurement data. Since the length is fixed, the width as setting parameter remains as a variable quantity. For resistances stipulated with particularly close tolerances at nominal temperature, it is possible to set the resistance of the individual components by means of an additional trimming process. In this case, ceramic material or electrode material is partially removed by, e.g., laser cutting, grinding, sawing in such a way that the resistance is adapted by the geometry alteration.

In order to improve the long-term stability of the ceramic, a thin nonconductive protective layer can be applied over the unmetallized region, said protective layer consisting of, e.g., ceramics, glasses, plastics or metal oxides. This can be achieved by means of sputtering, vapor deposition, lithography or printing and firing.

For use on circuit boards, the three variants of the sensor can be adhesively bonded, soldered or sintered onto the conductor tracks. The Ag sintering process can be carried out under pressure or without pressure. By means of soldering, welding or bonding, the top side of the sensor can be contacted with wires.

By virtue of the novel design of a sensor element 1 in accordance with FIGS. 1 to 6, two characteristic curves are realized in one component. As a result, it is possible to save space during mounting on the DCB board or the circuit board. The mechanical stability of the sensor element 1 is increased by the use of ceramic carrier materials based on, e.g., $Al_2O_3$, $ZrO_2$, ATZ or ZTA materials or MgO.

The process for producing a double NTC thick-film sensor according to the invention is explained in greater detail by way of example below:

In a first step, NTC powder is produced. This includes weigh-in, wet pre-grinding, drying, sieving, calcination, wet post-grinding, drying, and sieving again. The NTC powder is weighed in for production of the paste. Furthermore, organic components for the paste are weighed in.

In a further step, the paste components are pre-homogenized by stirring. Afterward, the paste components are homogenized using a 3-roll mill.

In a subsequent step, ceramic carrier material is printed with NTC paste on one side by means of screenprinting. By way of example, the underside of the carrier material is printed with NTC paste in this step. As an alternative thereto, it is also possible for the top side to be printed with NTC paste. The printing is carried out in a specific or first printing geometry. By way of example, in this case, the corresponding carrier surface is printed only partially or alternatively completely. By way of example, an edge region of the carrier material can be omitted during the printing. However, other printing geometries are also conceivable. Furthermore, a thickness of the later NTC layer can be set in this step. The thicker the NTC layer, the higher the resistance thereof.

The system comprising ceramic carrier material and NTC layer is then decarburized. Afterward, the system comprising ceramic carrier material and NTC layer is sintered.

In a subsequent step, the second carrier material side is printed with NTC paste by means of screenprinting. By way of example, the top side of the carrier material is printed with NTC paste in this step. As an alternative thereto, it is also possible for the underside to be printed with NTC paste. That outer face or surface of the carrier material which was omitted during the printing process on one side is printed.

The printing is carried out in a specific or second printing geometry. The second printing geometry can correspond to the first printing geometry. As an alternative thereto, the first and second printing geometries can be different. By way of example, the corresponding carrier surface is printed only partially or alternatively completely. By way of example, an edge region of the carrier material can be omitted during the printing. However, other printing geometries are also conceivable for the second printing geometry. Furthermore, a thickness of the later NTC layer can be set in this step. The thicker the NTC layer, the higher the resistance thereof. The thicknesses of the two NTC layers can be identical. As an alternative thereto, the NTC layers can also have different thicknesses.

The system is then decarburized. Afterward, the system is sintered. As an alternative thereto, it is also possible for both NTC layers to be printed successively and the system can subsequently be decarburized and sintered in a joint process. The iteration of decarburizing and sintering would be superfluous in this case.

In a further step, Ni/Ag thin-film electrodes are applied to the sintered sensor on both sides by means of sputtering technology. As an alternative thereto, the electrodes can also be applied by printing (thick-film electrodes). The electrodes are applied in accordance with variants 1 to 3 described above.

A further step involves electrically measuring the resistances of the individual sensor sides at nominal temperature on the carrier material, which has not yet been separated.

Afterward, the individual NTC layers are trimmed to the required resistance value by laser removal.

The sensor chips are singulated by sawing the carrier material between the printed NTC regions. The final geometry is produced by the separating process.

Finally, the visual inspection and a check measurement in a manner like random sampling are carried out.

The description of the subjects specified here is not restricted to the individual specific embodiments. Rather, the features of the individual embodiments can be combined—insofar as technically expedient—arbitrarily with one another.

The invention claimed is:

1. A sensor element for temperature measurement comprising:
   a ceramic carrier comprising a top side and an underside;
   a respective NTC layer arranged on the top side and on the underside of the carrier, wherein a resistance of the respective NTC layer depends on a thickness and/or geometry of the respective NTC layer; and
   at least two electrodes adjacent each of the NTC layers, wherein the electrodes belonging to the respective NTC layer are separated from each other by a free region between the electrodes, the free region running parallel to the top side and the underside of the carrier.

2. The sensor element according to claim 1, wherein the carrier is printed with the NTC layers, and wherein the NTC layers have different printing geometries.

3. The sensor element according to claim 1, wherein the carrier is printed with the NTC layers, and wherein a printing of the top side and of the underside of the carrier with the respective NTC layer is performed partially.

4. The sensor element according to claim 1, wherein the respective NTC layer has two opposite side surfaces, and wherein the respective electrodes are arranged at the side surfaces.

5. The sensor element according to claim 1, wherein the respective electrodes comprise at least one sputtered layer.

6. The sensor element according to claim 5, wherein the sputtered layer is directly arranged at the respective NTC layer.

7. The sensor element according to claim 1, wherein the respective electrodes comprise at least one printed layer.

8. The sensor element according to claim 7, wherein the printed layer is directly printed onto the respective NTC layer.

9. The sensor element according to claim 1, wherein at least one of the NTC layers has a cutout, and wherein the cutout sets the resistance of the NTC layer.

10. The sensor element according to claim 1, wherein the free region is embodied as a web, and wherein the electrodes are separated from one another by the web.

11. The sensor element according to claim 1, wherein the carrier is printed with the NTC layers, and wherein a printing of the top side and of the underside of the carrier with the respective NTC layer is performed over a whole area.

12. A method for producing a sensor element, the method comprising:
   providing a ceramic carrier material;
   printing a first surface of the carrier material with an NTC paste in a first printing geometry forming a first NTC layer;
   sintering a system comprising the carrier material and the first NTC layer;
   printing a second surface of the carrier material with an NTC paste in a second printing geometry forming a second NTC layer;
   sintering a system comprising the carrier material and the second NTC layer,
   wherein the surfaces of the carrier material are printed with the NTC pastes partially or over a whole area; and
   applying at least two electrodes to each NTC layer,
   wherein the electrodes belonging to a respective NTC layer are separated from each other by a free region between the electrodes, the free region running parallel to a top side and an underside of the carrier material.

13. The method according to claim 12, further comprising partially removing at least one of the NTC layers in order to set a predetermined resistance value.

14. The method according to claim 12, wherein the surfaces of the carrier material are partially printed with the NTC pastes.

15. The method according to claim 12, wherein the surfaces of the carrier material are printed with the NTC pastes over the whole area.

16. A sensor element for temperature measurement comprising:
   a ceramic carrier comprising a top side and an underside;
   a respective NTC layer arranged on the top side and on the underside of the carrier, wherein a resistance of the respective NTC layer depends on a thickness and/or geometry of the respective NTC layer; and
   at least one electrode adjacent the respective NTC layer,
   wherein a first electrode is located on the top side of the carrier,
   wherein a first NTC layer is arranged on a partial region of the first electrode,
   wherein a second electrode is arranged on the first NTC layer,
   wherein a second NTC layer is arranged on the underside of the carrier,
   wherein two electrodes are arranged at the second NTC layer, and
   wherein the two electrodes are separated from one another by a free region, the free region running parallel to a top side and an underside of the carrier.

17. The sensor element according to claim 16, wherein the first electrode is arranged directly on the top side of the carrier.

18. The sensor element according to claim 16, wherein the second electrode completely covers the first NTC layer on the top side of the carrier.

19. The sensor element according to claim 16, wherein only two electrodes are arranged at the second NTC layer.

20. The sensor element according to claim 16, wherein the carrier is printed with the NTC layers, and wherein the NTC layers have different printing geometries.

* * * * *